US010726196B2

United States Patent
Severn

(10) Patent No.: US 10,726,196 B2
(45) Date of Patent: Jul. 28, 2020

(54) AUTONOMOUS CONFIGURATION OF CONVERSION CODE TO CONTROL DISPLAY AND FUNCTIONALITY OF WEBPAGE PORTIONS

(71) Applicant: Evolv Technology Solutions, Inc., San Francisco, CA (US)

(72) Inventor: Robert Severn, Berkeley, CA (US)

(73) Assignee: Evolv Technology Solutions, Inc., San Francisco, CA (US)

( * ) Notice: Subject to any disclaimer, the term of this patent is extended or adjusted under 35 U.S.C. 154(b) by 4 days.

(21) Appl. No.: 15/911,050

(22) Filed: Mar. 2, 2018

(65) Prior Publication Data

US 2018/0253408 A1    Sep. 6, 2018

Related U.S. Application Data

(60) Provisional application No. 62/466,940, filed on Mar. 3, 2017, provisional application No. 62/470,066, filed on Mar. 10, 2017.

(51) Int. Cl.
*G06F 17/20* (2006.01)
*G06F 40/16* (2020.01)
(Continued)

(52) U.S. Cl.
CPC .............. *G06F 40/16* (2020.01); *G06F 3/00* (2013.01); *G06F 3/04847* (2013.01);
(Continued)

(58) Field of Classification Search
CPC . G06F 17/2282; G06F 3/04847; G06F 17/227
See application file for complete search history.

(56) References Cited

U.S. PATENT DOCUMENTS

| 4,935,877 A | 6/1990 | Koza |
| 5,136,686 A | 8/1992 | Koza |

(Continued)

FOREIGN PATENT DOCUMENTS

| WO | 2000002138 A1 | 1/2000 | |
| WO | WO-2010101519 A1 * | 9/2010 | ............. G06F 21/51 |

OTHER PUBLICATIONS

Oliver, A et al., "Interactive Design of Web Sites with a Genetic Algorithm" Feb. 2003, pp. 355-362 (Year: 2003).*

(Continued)

*Primary Examiner* — Shahid K Khan
(74) *Attorney, Agent, or Firm* — Haynes Beffel & Wolfeld, LLP; Andrew L. Dunlap; Paul A. Durdik

(57) ABSTRACT

The technology disclosed is generally directed to massively multivariate testing, conversion rate optimization, and product recommendation and, in particular, directed to automatically and autonomously placing conversion code (e.g., scripts) in webpages of a host website without requiring any affirmative action on the part of the host. The conversion code modifies display and functionality of a particular portion of a host webpage without modifying other portions of the host webpage. The conversion code is placed by a website modification service which is limitedly authorized by the host to modify only the particular portion of the host webpage under a product recommendation and/or conversion rate optimization scheme.

20 Claims, 12 Drawing Sheets

(51) Int. Cl.
*H04L 12/24* (2006.01)
*G06N 3/08* (2006.01)
*G06F 3/0484* (2013.01)
*G06N 5/04* (2006.01)
*G06F 3/00* (2006.01)
*G06F 40/154* (2020.01)
*G06N 3/063* (2006.01)
*G06N 3/12* (2006.01)
*G06N 20/00* (2019.01)

(52) U.S. Cl.
CPC .......... *G06F 40/154* (2020.01); *G06N 3/08* (2013.01); *G06N 5/04* (2013.01); *H04L 41/16* (2013.01); *H04L 41/22* (2013.01); *G06N 3/063* (2013.01); *G06N 3/126* (2013.01); *G06N 20/00* (2019.01)

(56) References Cited

U.S. PATENT DOCUMENTS

| | | | |
|---|---|---|---|
| 5,343,554 A | 8/1994 | Koza et al. | |
| 5,568,590 A | 10/1996 | Tolson | |
| 5,761,381 A | 6/1998 | Arci et al. | |
| 5,867,397 A | 2/1999 | Koza et al. | |
| 5,970,487 A | 10/1999 | Shackleford et al. | |
| 6,088,690 A | 7/2000 | Gounares et al. | |
| 6,304,863 B1* | 10/2001 | Murai | G06T 11/001 356/406 |
| 6,317,700 B1* | 11/2001 | Bagne | G06N 5/025 702/181 |
| 6,411,945 B1* | 6/2002 | Nakajima | B60C 1/00 703/1 |
| 6,523,016 B1 | 2/2003 | Michalski | |
| 6,957,200 B2 | 10/2005 | Buczak et al. | |
| 7,016,882 B2 | 3/2006 | Afeyan et al. | |
| 7,047,169 B2 | 5/2006 | Pelikan et al. | |
| 7,089,540 B2* | 8/2006 | Ogasawara | G06F 8/41 710/200 |
| 7,284,241 B2* | 10/2007 | Heishi | G06F 8/425 717/141 |
| 7,353,184 B2 | 4/2008 | Kirshenbaum et al. | |
| 7,356,518 B2 | 4/2008 | Bonabeau et al. | |
| 7,386,844 B2* | 6/2008 | Heishi | G06F 8/4432 712/E9.017 |
| 7,444,309 B2 | 10/2008 | Branke et al. | |
| 7,603,326 B2 | 10/2009 | Bonabeau et al. | |
| 7,624,077 B2 | 11/2009 | Bonabeau et al. | |
| 7,707,220 B2 | 4/2010 | Bonabeau et al. | |
| 7,882,048 B2 | 2/2011 | Bonabeau et al. | |
| 7,891,223 B2* | 2/2011 | Kaneko | B21D 43/05 72/14.8 |
| 8,117,139 B2 | 2/2012 | Bonabeau et al. | |
| 8,117,140 B2 | 2/2012 | Bonabeau et al. | |
| 8,423,323 B2 | 4/2013 | Bonabeau | |
| 8,719,105 B2* | 5/2014 | Minnis | G06Q 30/0244 705/26.1 |
| 8,775,341 B1 | 7/2014 | Commons | |
| 9,008,416 B2 | 4/2015 | Movellan et al. | |
| 2002/0082077 A1 | 6/2002 | Johnson et al. | |
| 2004/0122785 A1 | 6/2004 | Brown et al. | |
| 2004/0143559 A1 | 7/2004 | Ayala | |
| 2006/0225003 A1 | 10/2006 | Agogino et al. | |
| 2007/0094168 A1 | 4/2007 | Ayala et al. | |
| 2007/0239632 A1 | 10/2007 | Burges et al. | |
| 2007/0298866 A1 | 12/2007 | Gaudiano et al. | |
| 2009/0006375 A1* | 1/2009 | Lax | G06Q 30/02 |
| 2009/0030859 A1* | 1/2009 | Buchs | G06F 16/957 706/19 |
| 2009/0125370 A1 | 5/2009 | Blondeau et al. | |
| 2010/0241597 A1* | 9/2010 | Chen | G06F 16/958 706/12 |
| 2011/0004578 A1* | 1/2011 | Momma | G06N 20/00 706/12 |
| 2012/0290399 A1* | 11/2012 | England | G06Q 30/0282 705/14.66 |
| 2012/0303564 A1 | 11/2012 | Dobson et al. | |
| 2013/0024283 A1* | 1/2013 | Axe | G06Q 30/02 705/14.54 |
| 2013/0124440 A1 | 5/2013 | Hodjat et al. | |
| 2013/0198641 A1* | 8/2013 | Brownlow | G06F 3/0485 715/738 |
| 2013/0218821 A1 | 8/2013 | Szatmary et al. | |
| 2013/0282626 A1 | 10/2013 | White et al. | |
| 2014/0075336 A1* | 3/2014 | Curtis | G06F 3/0481 715/753 |
| 2014/0236875 A1 | 8/2014 | Phillipps et al. | |
| 2014/0281918 A1* | 9/2014 | Wei | H04L 67/02 715/234 |
| 2014/0321737 A1 | 10/2014 | Movellan et al. | |
| 2014/0372344 A1 | 12/2014 | Morris et al. | |
| 2015/0006442 A1 | 1/2015 | Ogilvie et al. | |
| 2015/0019173 A1 | 1/2015 | Amid et al. | |
| 2015/0286742 A1* | 10/2015 | Zhang | G06F 16/9577 715/252 |
| 2016/0267525 A1* | 9/2016 | Lin | G06Q 30/0246 |
| 2016/0342431 A1* | 11/2016 | Huang | G06F 16/958 |
| 2017/0031904 A1 | 2/2017 | Legrand et al. | |
| 2017/0039198 A1 | 2/2017 | Ramamurthy et al. | |
| 2017/0090734 A1* | 3/2017 | Fitzpatrick | G06F 17/2247 |
| 2017/0091319 A1 | 3/2017 | Legrand et al. | |
| 2017/0192638 A1 | 7/2017 | Iscoe et al. | |
| 2017/0193403 A1 | 7/2017 | Iscoe et al. | |
| 2017/0357896 A1 | 12/2017 | Tsatsin et al. | |
| 2018/0012250 A1* | 1/2018 | Malca | G06F 17/218 |
| 2018/0054499 A1* | 2/2018 | Greenberg | H04L 67/327 |
| 2018/0137143 A1 | 5/2018 | Brundage et al. | |
| 2018/0137390 A1 | 5/2018 | Brundage et al. | |
| 2018/0176081 A1* | 6/2018 | Zhong | G06F 16/9038 |
| 2018/0218389 A1* | 8/2018 | Walker | G06Q 30/0277 |
| 2018/0232242 A1* | 8/2018 | Onu | G06F 9/54 |

OTHER PUBLICATIONS

Miikkulainen, Risto, et. al., "Sentient Ascend: AI-Based Massively Multivariate Conversion Rate Optimization", 2018, 8 pages.
"It's All A/Bout Testing: The Netflix Experimentation Platform", Apr. 29, 2016, 9 pages, [Retrieved Oct. 4, 2016]. Retrieved from the Internet <URL: http://techblog.netflix.com/2016/04/itsallabout-testingnetflix. html>.
"Look Inside a 1,024 Recipt Multivariate Experiment", Aug. 13, 2009, 3 pages.
"Product Integration Testing at the Speed of Netflix", Jul. 5, 2016, 12 pages, [Retrieved Oct. 4, 2016] Retrieved from the Internet <URL:http://techblog.netflix.com/search/label/A%2FB%20Testing>.
Nesamoney, Diaz, "Personalized Digital Advertising", 2015, cover page through p. 6 and Index, 34 pages.
Saint-Amant, Chris, "Netflix Scaling A/B Testing on Netflix.com with Node.js", Aug. 18, 2014, 8 pages.
PCT/IB17/50043—International Search Report and Written Opinion dated May 24, 2017, 28 pages.
PCT/IB17/50044—International Search Report and Written Opinion dated Jun. 1, 2017, 21 pages.

* cited by examiner

300

```
                    {
                      "version": "2017-06-27",
    256      {         "treatmentId": "default",
                      "traits": {
                        "category1": {
                          "id": 13,
                          "experimentId": 34,
                          "candidateId": 9,
                          "generationId": 4,
                          "genes": {
                            "algorithm": "BAYES",
                            "seedLambda": 0.5,
                            "seedShrinkage": 0.5,
    124a     {               "multiSeedLambda": 0.5,
                            "brandKernelWeight": 2,
                            "colorKernelWeight": 2,
                            "entropyNumSamples": 500,
                            "brandSeedShrinkage": 0.5,
                            "colorSeedShrinkage": 0.5,
                            "multiSeedShrinkage": 0.5,
                            "productShrinkFactor": 0.5,
                            "entropyNumIterations": 50,
                            "hideDisplayedProducts": true
                          }
                        }
                      },
                      "environment": {
                        "client": "internal",
                        "name": "aware2",
    236      {         "categories": {
                          "category1": {
                            "apiUrl": "https://example-api-endpoint/v1"
                          }
                        },
    226      {         "reportingUrl": "https://reporting-api-endpoint/v1"
                        "currentCategory": "category1"
    124a     {       },
                      "features": {
                          "hideCTA": true
                      },
                      "scriptUrls": [
                        "https://static.sentientawareapi.com/2.0.1/dlls/polyfills.dll.js",
                        "https://static.sentientawareapi.com/2.0.1/dlls/vendor.dll.js",
    216      {         "https://static.sentientawareapi.com/2.0.1/dlls/sdk.dll.js",
                        "https://static.sentientawareapi.com/customizations/3.0.0/dlls/default/customizations.dll.js",
                        "https://static.sentientawareapi.com/2.0.1/browser/sentient-bootstrapped.min.js"
                      ]
                    }
```

| Logo | Main Headline | Sub Headline | Action Button |
|---|---|---|---|
| [[[1, 0], | [1, 0, 0, 0], | [1, 0, 0, 0, 0, 0]], | [[[1, 0], | [1, 0]], 124a |
| [[0, 1], | [1, 0, 0, 0], | [1, 0, 0, 0, 0, 0]], | [[[1, 0], | [1, 0]], |
| [[[1, 0], | [1, 0, 0, 0], | [1, 0, 0, 0, 0, 0]], | [[[1, 0], | [1, 0]], |
| [[[1, 0], | [0, 1, 0, 0], | [1, 0, 0, 0, 0, 0]], | [[[1, 0], | [1, 0]], |
| [[[1, 0], | [0, 0, 1, 0], | [1, 0, 0, 0, 0, 0]], | [[[1, 0], | [1, 0]], |
| [[[1, 0], | [0, 0, 0, 1], | [1, 0, 0, 0, 0, 0]], | [[[1, 0], | [1, 0]], |
| [[[1, 0], | [1, 0, 0, 0], | [0, 1, 0, 0, 0, 0]], | [[[1, 0], | [1, 0]], |
| [[[1, 0], | [1, 0, 0, 0], | [0, 0, 1, 0, 0, 0]], | [[[1, 0], | [1, 0]], |
| [[[1, 0], | [1, 0, 0, 0], | [0, 0, 0, 1, 0, 0]], | [[[1, 0], | [1, 0]], |
| [[[1, 0], | [1, 0, 0, 0], | [0, 0, 0, 0, 1, 0]], | [[[1, 0], | [1, 0]], |
| [[[1, 0], | [1, 0, 0, 0], | [1, 0, 0, 0, 0, 0]], | [[0, 1], | [1, 0]], |
| [[[1, 0], | [1, 0, 0, 0], | [1, 0, 0, 0, 0, 0]], | [[[1, 0], | [0, 1]], |
| [[[1, 0], | [1, 0, 0, 0], | [1, 0, 0, 0, 0, 0]], | [[[1, 0], | [1, 0]], |
| [[[1, 0], | [1, 0, 0, 0], | [1, 0, 0, 0, 0, 0]], | [[0, 1], | [1, 0]], |
| [[[1, 0], | [1, 0, 0, 0], | [1, 0, 0, 0, 0, 0]], | [[[1, 0], | [0, 1]]] |

FIG. 7C

AUTONOMOUS CONFIGURATION OF CONVERSION CODE TO CONTROL DISPLAY AND FUNCTIONALITY OF WEBPAGE PORTIONS

PRIORITY DATA

This application claims the benefit of U.S. Provisional Patent Application No. 62/466,940, titled "AI CONFIGURATION AND OPTIMIZATION OF WEB COMPONENTS HOSTED ON A THIRD PARTY SITE", filed on Mar. 3, 2017. The provisional application is hereby incorporated by reference for all purposes; and This application claims the benefit of U.S. Provisional Patent Application No. 62/470,066, titled "AI CONFIGURATION AND OPTIMIZATION OF WEB COMPONENTS HOSTED ON A THIRD PARTY SITE", filed on Mar. 10, 2017. The provisional application is hereby incorporated by reference for all purposes.

INCORPORATIONS

The following materials are incorporated by reference as if fully set forth herein:

Miikkulainen, Risto, Neil Iscoe, Aaron Shagrin, Ryan Rapp, Sam Nazari, Patrick McGrath, Cory Schoolland, Elyas Achkar, Myles Brundage, Jeremy Miller, Jonathan Epstein and Gurmeet Lamba. "Sentient Ascend: AI-Based Massively Multivariate Conversion Rate Optimization." (2017) ("Miikkulainen et al.");

U.S. Nonprovisional patent application Ser. No. 15/399,433, titled "MACHINE LEARNING BASED WEBINTERFACE GENERATION AND TESTING SYSTEM", filed on Jan. 5, 2017;

U.S. Nonprovisional patent application Ser. No. 15/399,450, titled "MACHINE LEARNING BASED WEBINTERFACE PRODUCTION AND DEPLOYMENT SYSTEM", filed on Jan. 5, 2017;

U.S. Nonprovisional patent application Ser. No. 15/813,019, titled "DATA OBJECT CREATION AND RECOMMENDATION USING MACHINE LEARNING BASED OFFLINE EVOLUTION", filed on Nov. 14, 2017;

U.S. Nonprovisional patent application Ser. No. 15/813,041, titled "DATA OBJECT CREATION AND RECOMMENDATION USING MACHINE LEARNING BASED ONLINE EVOLUTION", filed on Nov. 14, 2017;

U.S. Nonprovisional patent application Ser. No. 15/295,926, titled "VISUAL INTERACTIVE SEARCH, SCALABLE BANDIT-BASED VISUAL INTERACTIVE SEARCH AND RANKING FOR VISUAL INTERACTIVE SEARCH", filed on Oct. 17, 2016;

U.S. Nonprovisional patent application Ser. No. 15/295,930, titled "SELECTION OF INITIAL DOCUMENT COLLECTION FOR VISUAL INTERACTIVE SEARCH", filed on Oct. 17, 2016;

U.S. Nonprovisional patent application Ser. No. 15/373,897, titled "BAYESIAN VISUAL INTERACTIVE SEARCH", filed on Dec. 9, 2016; and U.S. Nonprovisional patent application Ser. No. 15/619,299, titled "CONTENT EMBEDDING USING DEEP METRIC LEARNING ALGORITHMS", filed on Jun. 9, 2017.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. The technology disclosed is generally directed to massively multivariate testing, conversion rate optimization, and product recommendation.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Common methods for running controlled experiments on websites include sophisticated conversion optimization solutions. Conversion optimization includes testing multiple combinations and variations of webpages and webpage elements at the same time. For example, two alternative images, plus two alternative headlines, plus two copy text alternatives, for a total of twenty-seven possible combinations (including the original control versions) may be provided. Thus, conversion optimization introduces a rather complex set of permutations and combinations that need to be analyzed to determine the most effective combination of webpage elements that truly engage the users.

As Big Data plays a more important role in web personalization, the number of data signals, the complexity of rules, and the sheer number of outcomes has increased exponentially. As that happens, human optimization simply cannot be done except perhaps after the fact, where there is little to no opportunity to impact the outcome. Algorithmic optimization is required, but even there, simple linear regression algorithms that can handle linear relationships and correlations may not be able to sufficiently create improved outcomes, given the vast number of data inputs and resulting measurements that have to be processed to predict performance.

In e-commerce, designing user experiences, i.e., webpages and interactions, which convert as many users as possible from casual browsers to paying customers is an important goal. While there are some well-known design principles, including simplicity and consistency, there are also often unexpected interactions between elements of the webpage that determine how well it converts. The same element may work well in one context but not in others. It is often hard to predict the result, and even harder to decide how to improve a given webpage.

An entire industry has emerged to tackle these challenges; it is called conversion rate optimization, or conversion science. The standard method most practitioners use is A/B testing, i.e., designing two different versions of the same webpage, showing them to different users, and collecting statistics on how well they each convert. This process allows incorporating human knowledge about the domain and conversion optimization into the design, and then testing their effect. After observing the results, new designs can be compared and gradually improved. The A/B testing process is difficult and time-consuming: only a very small fraction of webpage designs can be tested in this way and subtle interactions in the design may simply be missed completely.

Machine learning systems are utilized to run tests where many variables with very complex relationships between them are involved in determining outcomes. Machine learning systems typically attempt to learn from the data to figure out the formula, rather than to try to figure out a formula to begin with, given that the relationships between the variables may be too complex to determine the algorithm in advance. Therefore, with so many variables at play in conversion optimization, very sophisticated algorithms are desirable that utilize machine learning, artificial intelligence, and other non-linear algorithms to make predictions about outcomes based on learning from large data sets of inputs.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 3 is one implementation of the example object of FIG. 2 in a JavaScript Object Notation (JSON) format.

FIGS. 7A, 7B, and 7C show various aspects of the machine-learned configurations that are part of the objects returned to the clients.

DETAILED DESCRIPTION

Figure 1:
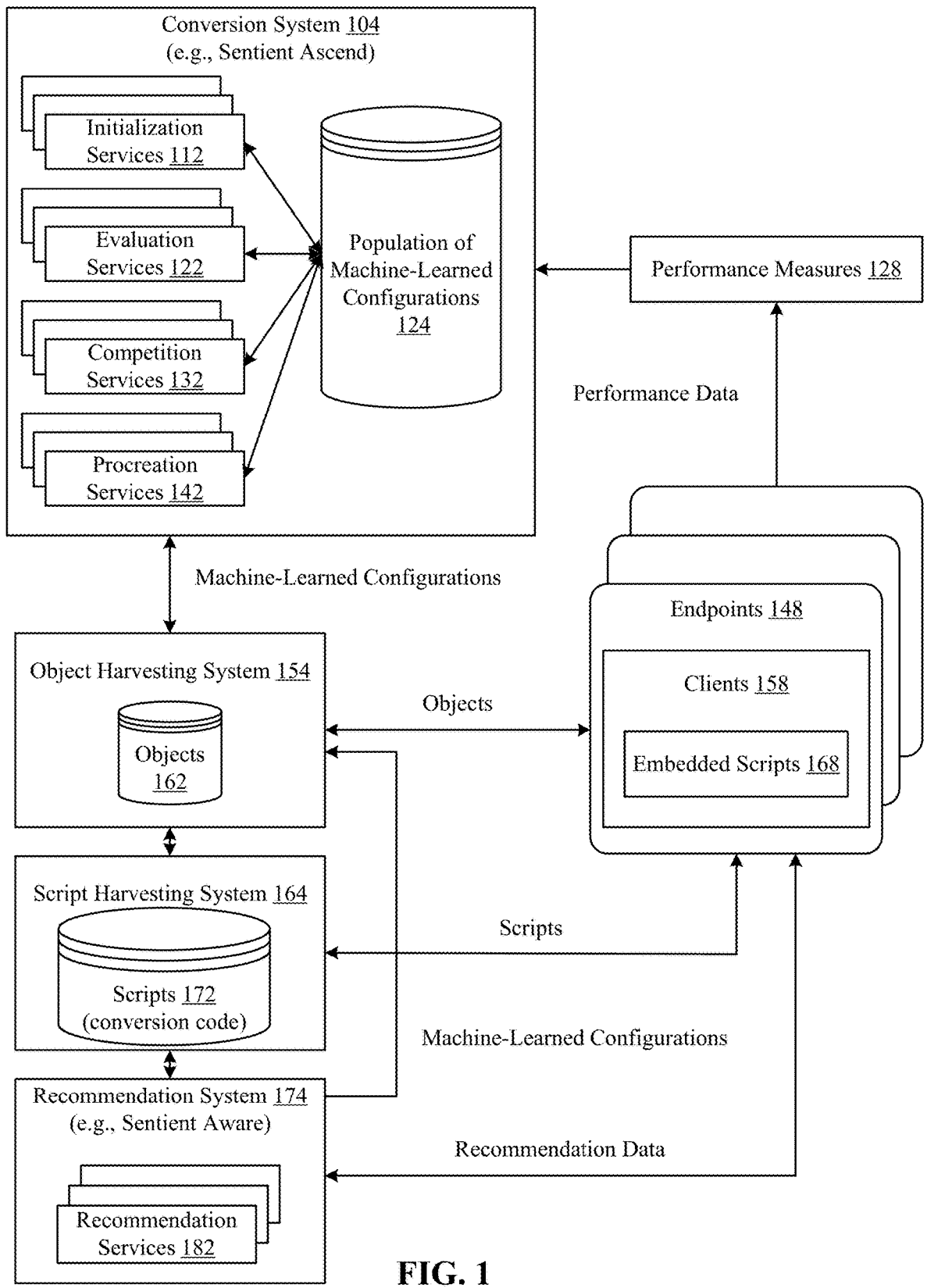
FIG. 1 illustrates aspects of a system that implements autonomous configuration of conversion code that controls display and functionality of a portion of a webpage.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

A website host may employ a website modification service like Sentient Technologies™ to provide a presentation of its webpages that maximizes conversion. The modification begins with the host website placing a code snippet (conversion script) provided by the website modification service in its webpages. Conversion script causes conversion rate optimization experiments to be run on the live web site, which includes altering appearance of certain portions of the webpages and recording responses across thousands of users.

Selectively modifying user interface (UI) widgets (portions) of the webpages requires coordination between the website modification service and the host website. Testing and improving such UI widgets can be complicated when the website modification service does not control the system on which the host website runs. In addition, it is not feasible to request the website host to make changes at the frequency desired by the website modification service.

Further, the conversion script may need to be updated over time because an improved version of the conversion script is ready for release or the current version of the conversion script may have bugs or may be susceptible to malware. Requiring the website host to periodically place updated versions of the conversion script in its webpages can be burdensome and diminish its customer experience.

The technology disclosed allows for automatically and autonomously placing conversion code (e.g., scripts) in webpages of a host website without requiring any affirmative action on the part of the host. The conversion code modifies display and functionality of a particular portion of a host webpage without modifying other portions of the host webpage. The conversion code is placed by a website modification service which is limitedly authorized by the host to modify only the particular portion of the host webpage under a product recommendation and/or conversion rate optimization scheme.

Also, the updated versions of the conversion script can be sent to a select population of test clients, prior to being released to the general user population. This enables preliminary testing of the updated versions in advance of publication to the wider audience. Test clients can be selectively sent the updated versions by targeting them using their IP addresses, browser cookie data, or specific URLs associated with them. Depending on how the updated versions perform with the test clients, the updated versions can be made available to the broader user base and can replace the current version of the conversion script.

The technology disclosed does so by responding to user requests for the host webpage by returning toward the user an object that includes rendering values corresponding to dimensions of elements of the portion of the webpage as selected by a first machine-learned configuration, an identification of one or more additional scripts with conversion code required in order to generate an updated interface version of the portion of the webpage by applying the first machine-learned configuration to the portion of the webpage and to control functionality of the updated interface version, and an identification of evaluation services to which to send data for performance measures that identify success of the updated interface version in promoting target online user behavior.

In one implementation, the technology disclosed implements massively multivariate testing of machine-learned configurations of portions of a webpage. Massively multivariate testing refers to using artificial intelligence-based evolutionary computations to test thousands and millions of variations of portions of a webpage. Additional details about massively multivariate testing can be found in Miikkulainen et al.

The terms "candidate individual(s)", "individual(s)", "genome(s)", "machine-learned configuration(s)", and "configuration(s)" are used interchangeably herein.

System

FIG. 1 illustrates aspects of a system that implements autonomous configuration of conversion code that controls display and functionality of a portion of a webpage.

System 100 comprises a script harvesting system 164, which is coupled to or has access to scripts 172. Scripts 172 or conversion scripts are code snippets (e.g., written in JavaScript) which are embedded in the webpages. The webpages often belong to a host like Shoes.com™ and the scripts 172 are provided by a website modification service like Sentient Technologies™, which is engaged by the host to implement conversion rate optimization on its webpages.

The website modification service has control only over certain portions of the webpage, as authorized by the host. The website modification service then changes appearance of the authorized/controlled portions of the webpage as part of a product recommendation and/or conversion rate optimization scheme. The website modification service does so by placing so-called "conversion scripts" in the HTML of the webpage. In the webpage's HTML, The conversion scripts are placed corresponding to the location of the authorized portions of the webpage such that the conversion scripts modify only the authorized portions and do not impact the unauthorized/uncontrolled portions.

Figure 4:
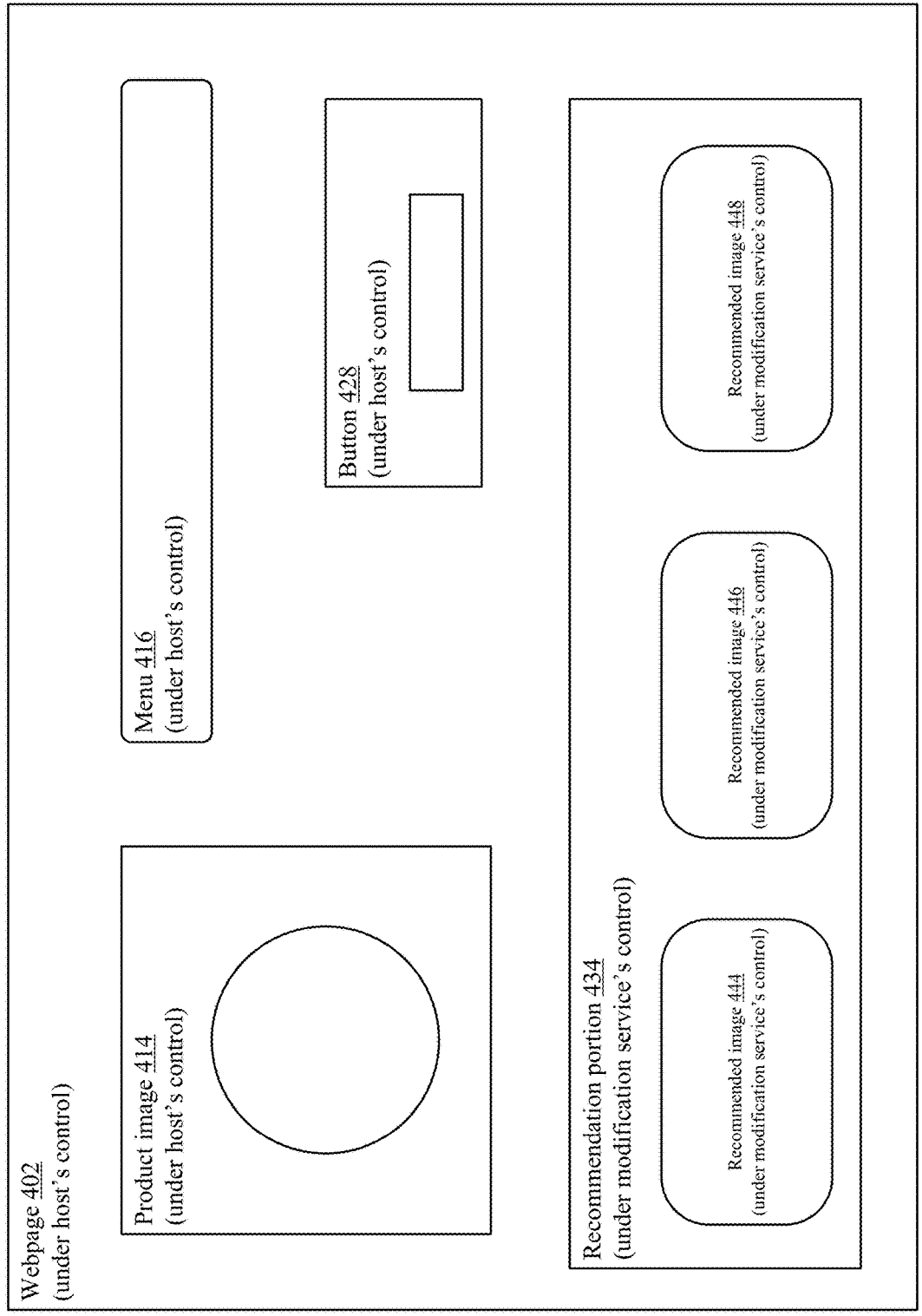
FIG. 4 is a graphic that depicts an example recommendation portion of a webpage whose display and functionality are modified by the contents of the object of FIG. 2, particularly the machine-learned configuration and the additional scripts identified in the object.

FIG. 4 illustrates division 400 of an example webpage 402 into portions that are under the host's control (e.g., product image 414, menu 416, button 428) and a recommendation portion 434 that is under the control of a conversion script developed by the website modification service. The conversion script controls the appearance of the recommendation portion 434 and its constituent elements 444, 446, and 448 in dependence upon a machine-learned configuration, as discussed later in this application. In addition, the conversion script controls the logic for how the recommendation portion 434 and its constituent elements 444, 446, and 448 interact with the users (e.g., in response to the user selection or hovering). Also, the conversion script controls the logic for what content is presented by the recommendation portion 434 and its constituent elements 444, 446, and 448 (e.g., images of recommended products). Further, the conversion script controls the logic for which resources can provide such content (e.g., which ones of the recommendation services 182). Furthermore, the conversion script controls the logic for where and how feedback events (e.g., user clicks) are reported as performance data for the performance measures 128. Put together, upon execution, the conversion script generates an interface version of the recommendation portion 434 and controls functionality of the generated interface version.

Scenarios arise when a current version of the conversion script needs to be updated or upgraded to a next version. To perform the upgrade in an autonomous manner, i.e., without seeking any affirmative action or involvement of the host and without disrupting any unauthorized/uncontrolled portions of the webpage, the technology disclosed utilizes a so-called object to identify one or more conversion scripts that need to replace an existing conversion script. This object also identifies a machine-learned configuration that the new conversion scripts can apply to the recommendation portion 434 to change the appearance of the recommendation portion 434 and its constituent elements 444, 446, and 448. In addition, the new conversion scripts can also introduce new logic for other aspects of the interface version of the recommendation portion 434 as well, including, for example, providing new content from new sources of content, reporting performance data to new evaluation services, and so on. Put together, upon execution, the new conversion scripts generate an updated interface version of the recommendation portion 434 and controls functionality of the updated interface version.

Object

The following discussion focuses on the contents of the object and its deployment to the clients.

During operation, when a user requests a webpage via a client (e.g., browser or native app), the client looks up the script embedded in the webpage and executes the script. The script will ultimately cause rendering of the webpage to the user, but the rendering is preceded by a series of steps that are discussed below.

Once executed, the embedded scripts 168 request and receive objects from an object harvesting system 154. Object harvesting system 154 is coupled to or has access to objects 162. Object harvesting system 154 is also coupled to or has access to population 124 of the conversion system 104 and the recommendation services 182, from which it receives machine-learned configurations.

Figure 2:
FIG. 2 shows components of an example object that is returned to a client in response to the client requesting a configuration of a portion of a webpage. Note that the example object is generated by a website modification service that is engaged by a host of the webpage to implement product recommendation and conversion rate optimization.

FIG. 2 shows components 200 of an example object 162a that is returned to a client in response to the client requesting a configuration of a webpage. Object 162a can be encoded in any data serialization format, such as JavaScript Object Notation (JSON), Binary JSON (BSON), MessagePack (msgpack), and YAML.

Figure 6:
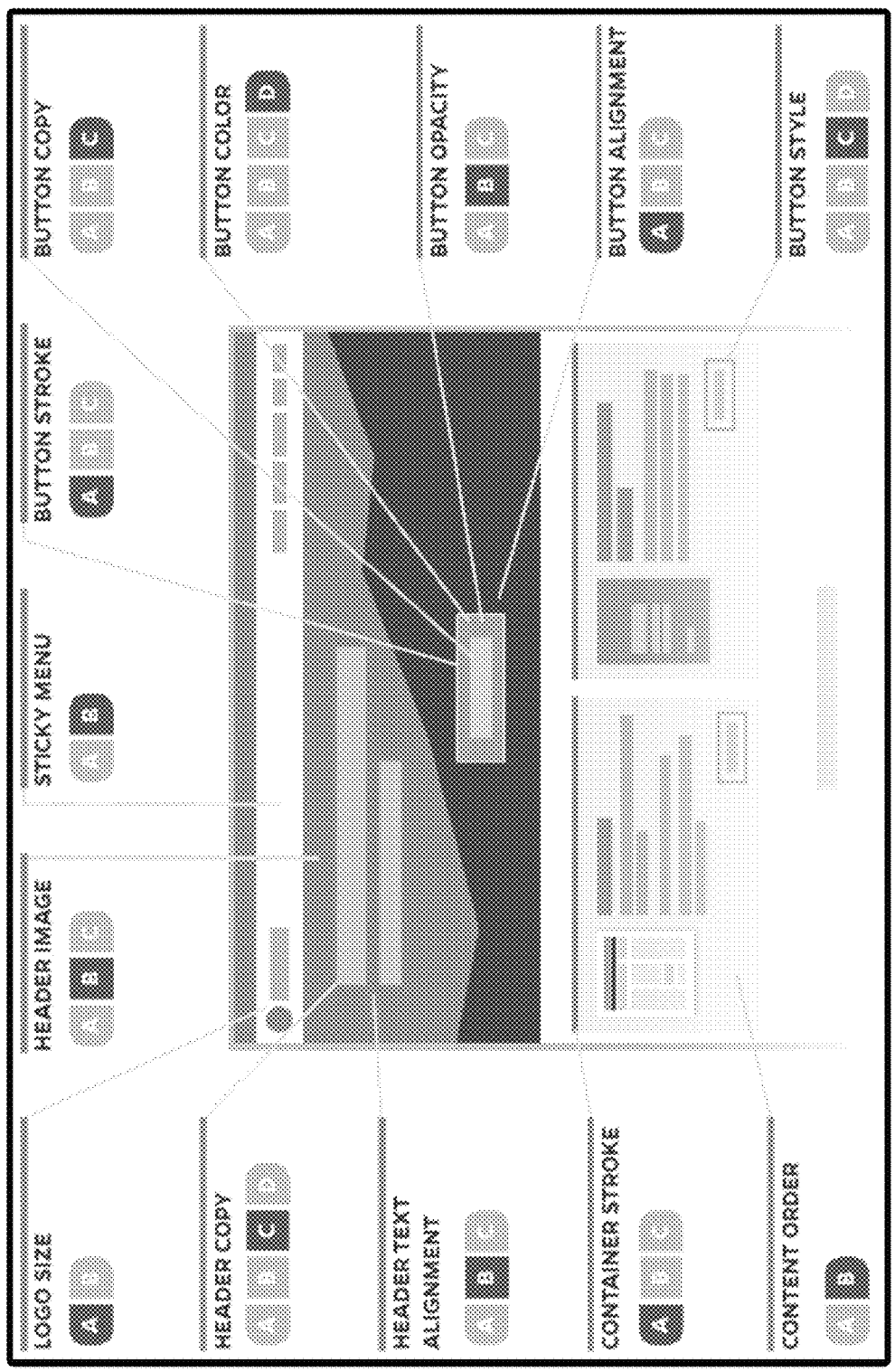
FIG. 6 illustrates one implementation of rendering values corresponding to dimensions of elements of portions of a webpage.

Object 162a includes rendering values corresponding to dimensions of elements of the portion of the webpage as selected by a first machine-learned configuration 124a. Consider the example webpage 600 in FIG. 6. The following hierarchy shows elements of the webpage 400 (top-level), dimensions corresponding to the elements (intermediate-level), and rendering values corresponding to the dimensions (terminal-level).

header
  header image
    A, B, C
  header copy
    A, B, C, D
  header text alignment
    A, B, C
logo
  logo size
    A, B
menu
  sticky menu
    A, B
button
  button stroke
    A, B, C
  button copy
    A, B, C
  button color A, B, C, D
  button opacity
   A, B, C
  button alignment
   A, B, C
  button style
   A, B, C, D
 container
  container stroke
   A, B, C
 content
  content order
   A, B In the above hierarchy, characters A, B, C, D are symbolic and represent rendering values applicable to the corresponding dimension. For example, rendering values for the dimension button color can be red, green, orange, yellow, black, etc. Rendering values for the dimension button copy can be "Buy now", "Add to Cart", "I want it!", "Add to Secure Cart", "This one!", etc. Rendering values for the logo size can be 500px, 450px, 400px, 350px, 300px, etc.

More importantly, the first machine-learned configuration 124a modifies only those elements which are under a portion of the webpage 600 that is controlled by the website modification service. The first machine-learned configuration 124a can be provided by an evolutionary computation-based system such as Sentient's Ascend™ 104. The first machine-learned configuration 124a can also be provided a recommendation-based system like Sentient's Aware™ 174.

Object 162a includes an identification 216 (e.g., a list) of additional scripts 172 with conversion code required in order to generate an updated interface version of the portion of the webpage by applying the first machine-learned configuration to the portion of the webpage and to control functionality of the updated interface version. The additional scripts 172 can be new and improved versions of the originally embedded script that will replace the originally embedded script as part of a migration or upgrade scheme. The additional scripts 172 can also serve as supplementary scripts that are required in addition to the originally embedded script for rendering additional or improved elements of portions of the webpage as selected by the first machine-learned configuration 124a, for requesting recommendation data in response to an element of the updated interface version of the portion of the webpage being selected, or for collecting performance data for performance measures 128 that identify success of the updated interface version in promoting target online user behavior.

Object 162a also includes an identification 226 (e.g., a list) of the evaluation services 122 to which to send performance measures 128 that identify success of the updated interface version in promoting target online user behavior.

System 100 comprises a recommendation system 174, which comprises recommendation services 182 (e.g., Sentient's Aware™). The object harvesting system 154 also receives machine-learned configurations from the recommendation services 182 in the form of recommendation data. The object includes an identification 236 (e.g., a list) of recommendation services 182 from which to request recommendation data in response to an element of the updated interface version of the portion of the webpage being selected. The object also includes a load modulator 246 that determines from which one of the recommendation services 182 to request the recommendation data. The determination can be based on at least one of (i) processing load of the recommendation services 182, (ii) pre-caching status of the recommendation services 182, and (iii) recommendation algorithms used by the recommendation services 182. Detailed information about the recommendation services 182 and the recommendation algorithms can be in found incorporated application Ser. Nos. 15/813,019; 15/813,041; 15/295,926; 15/295,930; 15/373,897; and 15/619,299.

Object 162a also includes a treatment ID 256 for itself. Treatment ID 256 is persisted at the client (e.g., in the browser cookie) for use in requesting further configurations of the portion of the webpage from the client. Treatment ID 256 can be used to successively return the same object 162a to the client as part of a battery of tests or trials of the object 162a. In other implementations, different objects can be returned to the client using different treatment IDs.

FIG. 3 is one implementation of the example object of FIG. 2 in a JavaScript Object Notation (JSON) format 300. In JSON code 300, the additional scripts 216 are identified as "scriptUrls", which further contains links to five scripts. These scripts, when executed by the client, generate the updated interface version of the portion of the webpage, as discussed above.

As indicated by the URLs of the "scriptUrls" code 216, the version of the scripts is 2.0.1. A person skilled in the art will appreciate that a later version of the scripts can be configured in the webpage by populating the object with URLs of the later version (e.g., 2.1.0). Code 236 identifies sources of recommendation data via the "apiUrl" field. Code 226 identifies the location of the evaluation or reporting service via the field "reporting Url". Code 256 identifies the treatment ID of the object 162a via the field "treatmetnId". Code 124a shows some examples of rendering values specified by the machine-learned configuration 124a, including, the type of the algorithm to determine the rendering values (e.g., Bayes), and other interface parameters like feature flags and rendering algorithm parameters such as seed Lambda, seed Shinkage, multi seed Lamda, shrink factor, kernel weight, etc.

System 100 comprises a conversion system 104 (e.g., Sentient's Ascend™) Conversion system 104 implements evolutionary computations to identify high-performing candidate individuals in a candidate search space.

Conversion system 104 collects and develops performance measures 128 for configurations in configuration population 124. When scripts 168 (embedded in clients 158 (e.g., browsers or native apps running on endpoints 148)) are executed, the configurations are transformed into webpages that are rendered to users for live online evaluation. Performance measures 128 are determined for corresponding configurations based on performance data (e.g., user clicks) generated by the live online evaluation.

Each webpage has a mechanism by which promotion or achievement of a target user behavior can be detected. In one implementation, the target user behavior is conversion by users. For each webpage, conversion can be detected based on a conversion goal defined by a designer, marketer, advertiser, or content creator. Examples of a conversion goal include a user reaching a specific webpage (e.g., a thank you page), a user clicking a link or button or other user interface element on a webpage, or any other custom event defined by the designer (e.g., using jQuery). Other examples of a conversion goal include a user clicking a "Buy Now" button on Amazon.com™, a user clicking a "Sign Up" button on an e-mail registration page, a user clicking a "Download Now" button on an application landing page, a user filling out a form to download a report, a user signing up for a webinar, a user completing a purchase process, a user adding an item to a shopping cart, a user initializing a shopping cart checkout, and a user making a pledge to read a book. The conversion goals can be different for different webpages and for different testing environments.

Conversion system 104 operates according to the performance measures 128, which indicate to the conversion system 104 how to measure the fitness of a configuration. Conversion system 104 optimizes for configurations that have the greatest fitness, however fitness is defined by the performance measures 128. Performance measures 128 are an indication of success of a configuration and corresponding webpage in achieving a target user behavior. Performance measures 128 are specific to the environment and goals of the particular application. In a webpage testing environment, for example, the performance measures 128 can be a function of a conversion goal defined for a webpage. In one implementation, the performance measures 128 are based on a "conversion rate". Conversion rate is a ratio of end users who visit a webpage and complete the conversion goal defined for the webpage (i.e., what percentage of the visitors complete the conversion goal). For example, a website with 5000 visitors and 50 conversions has a conversion rate of 1%. In another implementation, the performance measures 128 are based on a "revenue rate". Revenue rate is a revenue amount (e.g., numerical dollar value) generated per user as a result of the users completing the conversion goal defined for the webpage.

Live online evaluation means real time tests or trials where webpages constructed from the configurations are presented to users for testing in the real world. During live online evaluation, the performance measures 128 are determined for the configurations based on real-time and real-world user interaction with the corresponding webpages. Typically, for each webpage, the performance measures 128 are determined over a sample of users (e.g., 1000 or 2000 users). Note that the performance measures 128 calculated based on the performance of the webpages during the live online evaluation are associated with or linked to or assigned to the corresponding configurations used to generate the webpages. The performance measures 128 are then used by the evolutionary computations to procreate high-performing configurations.

Conversion system 104 interacts with a database containing the configuration population 124. As used herein, the term "database" does not necessarily imply any unity of structure. For example, two or more separate databases, when considered together, still constitute a "database" as that term is used herein. In some implementations, the database can store information from one or more tenants into tables of a common database image to form an on-demand database service (ODDS), which can be implemented in many ways, such as a multi-tenant database system (MTDS). A database image can include one or more database objects. In other implementations, the database can be a relational database management system (RDBMS), object oriented database management system (OODBMS), distributed file system (DFS), no-schema database, or any other data storing system or computing device.

In one implementation, configurations in the population 124 are stored and managed by conventional database management systems (DBMS), and are accessed using SQL statements. Thus, a conventional SQL query can be used to obtain, for example, the performance measures 128 of the configurations. New configurations can be inserted into the population 124 using the SQL "insert" statement, and configurations being discarded can be deleted using the SQL "delete" statement. In another implementation, the configurations in the population 124 are stored in a linked list. In such an implementation, insertion of a new configuration can be accomplished by writing its contents into an element in a free list, and then linking the element into the main linked list. Discarding of configurations involves unlinking them from the main linked list and re-linking them into the free list.

Conversion system 104 also comprises initialization services 112, evaluation services 122, competition services 132, and procreation services 142. Detailed information about these services can be in found incorporated application Ser. Nos. 15/399,433; 15/399,450; 15/813,019; and 15/813,041. The incorporated applications refer to these services as population initialization module, candidate testing module, competition module, and procreation module, respectively.

Initialization services 112 initialize the population 124 by writing a preliminary pool of configurations in the population 124 and by defining a candidate search space.

Evaluation services 122 test the configurations in the population 124. Each configuration undergoes a battery of tests or trials, each trial testing the configurations on one or multiple samples of users with sample sizes ranging from hundreds, thousands, and millions of users. In another implementation, the number of tests or sample size is determined by parameters associated with the test. Examples of such test parameters include number of visitors per unit time, existing conversion rate, size of the candidate search space, preferred risk tolerance, and the type of performance measure. The tests or trials are implemented as live online evaluation where the webpages generated from the configurations are presented to users for testing in the real world.

Performance measures 128 are determined from the performance data generated by the live online evaluation. Evaluation services 122 then modify the performance measures 128 associated with each of the tested configurations.

Competition services 132 update the population 124 in dependence upon the modified performance measures 128. Competition services 132 discard configurations that do not meet a minimum baseline fitness (e.g., preset by an administrator or automatically set), or configurations whose fitness relatively lags the fitness of similarly tested configurations. Population 124 is accordingly updated with the revised contents.

Procreation services 142 use crossover and mutation techniques to add new configurations to the population 124. Procreation services 142 form new configurations based on one or more parent configurations in the population 124.

The elements of system 100 can be in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, SecureID, digital certificates and more, can be used to secure the communications.

Messaging

Figure 5A:
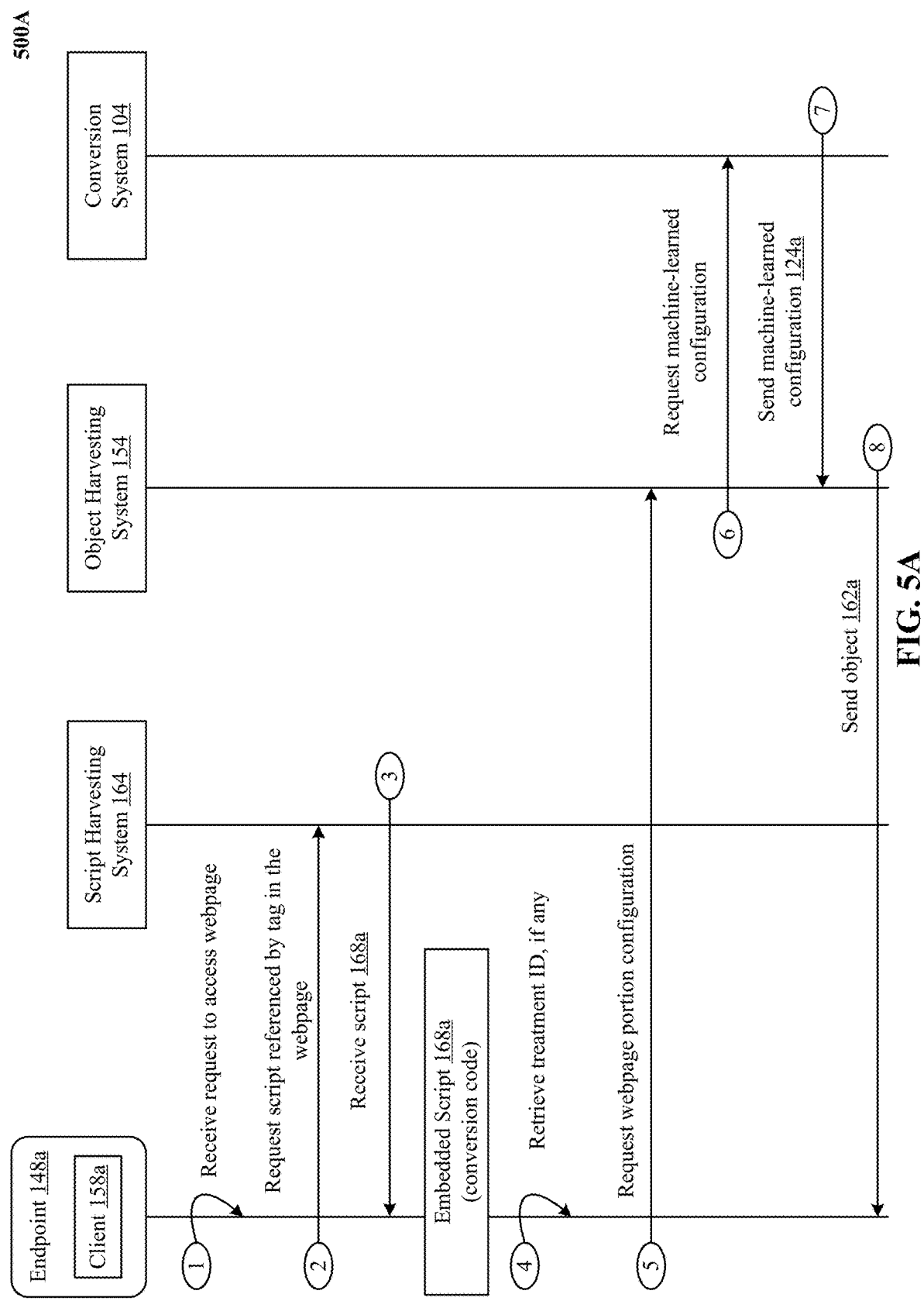
FIG. 5A depicts a message sequence chart of configuring a client with the example object of FIG. 2, according to one implementation.

FIG. 5A depicts a message sequence chart 300A of configuring a client 158a (e.g., a browser or a native app running on endpoint 148a) with the example object 162a, according to one implementation.

At message 1, client 158 receives a request from a user to access a webpage (e.g., triggered by the user entering the webpage's URL in the browser).

At message 2, client 158 identifies a script referenced by a tag of the webpage and requests the referenced script from the script harvesting system 164.

At message 3, script harvesting system 164 sends the referenced script to the client 158a. As a result, the referenced script is embedded in the webpage. Once embedded, the referenced script can be called the original or initial script 168a and the embedding action can be called provisioning. In some implementations, script 168a is provisioned from a content delivery network (CDN).

At message 4, embedded script 168a initiates the process of rendering the webpage requested by the user. As a first step, the embedded script 168a determines whether there is a treatment ID stored in the browser cookie. It does so to ensure that the user is presented with the same configuration of a portion of the webpage that the user previously experienced. This adds consistency to the user experience and allows for testing a particular configuration over multiple user interactions.

At message 5, if a treatment ID is found in the browser cookie, the embedded script 168a uses it to request a configuration of the portion of the webpage from the object harvesting system 154.

At message 6, object harvesting system 154 uses the treatment ID provided by the embedded script 168a to request a machine-learned configuration of the portion of the webpage from the conversion system 104. In other implementations, the configuration is requested from the recommendation system 174.

At message 7, the conversion system 104 provides the object harvesting system 154 with a machine-learned configuration 124a of the portion of the webpage. This configuration may be the same configuration as previously returned toward the user (and thus have the same treatment ID as the one requested by the embedded script 168a), or it may be a different configuration with a different treatment ID than the one requested by the embedded script 168a.

At message 8, object harvesting system 154 sends the object 162a to the embedded script 168a. Components 200 of the object 162a can include the machine-learned configuration 124a evolved by the conversion system 104, identification 216 of additional scripts 172 which identify an updated interface version of the portion of the webpage, identification 226 of evaluation services 122, identification 236 of recommendations services 182, a load modulator 246, and a treatment ID 256.

Figure 5B:
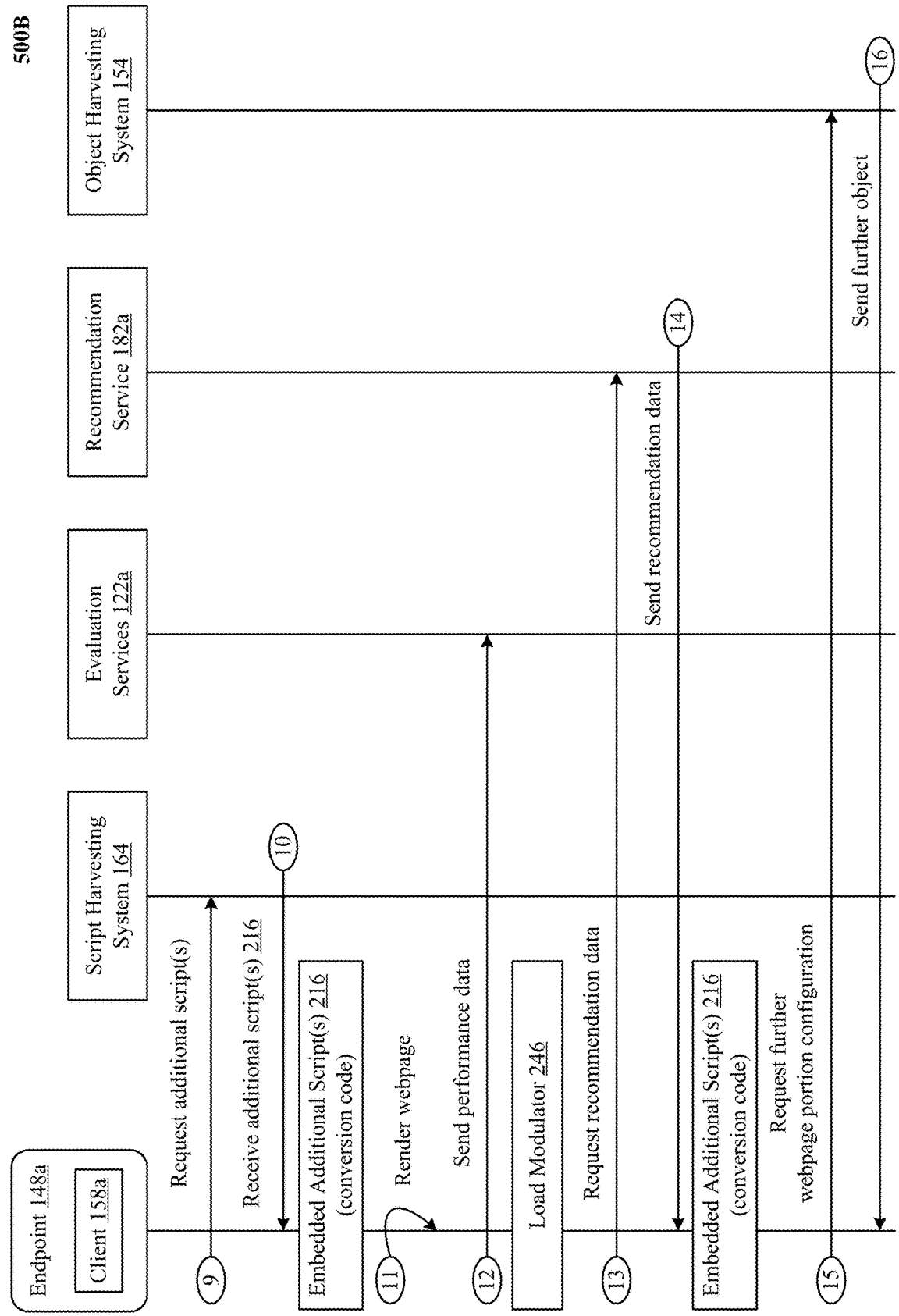
FIG. 5B is a message sequence chart of using the example object of FIG. 2 to render an updated interface version of a portion of a webpage, send performance data pertaining to the updated interface version, and request recommendation data pertaining to the updated interface version, according to one implementation.

FIG. 5B is a message sequence chart 500B of using the example object of FIG. 2 to render an updated interface version of a portion of a webpage, send performance data pertaining to the updated interface version, and request recommendation data pertaining to the updated interface version, according to one implementation.

At message 9, embedded script 168a requests the script harvesting system 164 for additional scripts 172 identified by the object 162a. The additional scripts 172 generate an updated interface version of the portion of the webpage, as discussed above. The updated interface version of the portion of the webpage presents at least one of: (i) a new arrangement of existing elements of the portion of the webpage, (ii) new elements of the portion of the webpage with new dimensions and new rendering values, (iii) new dimensions of the existing elements, (iv) new rendering values of existing dimensions, and/or (v) new functionality of the elements in response to user selection (e.g., rendering different recommendation data (e.g., images), using different recommendation algorithm to generate the recommendation data, transitioning to a different subsequent webpage).

The updated interface version of the portion of the webpage can be autonomously rendered without affirmative action from a host of the webpage.

The additional scripts can be returned to selective test clients based on a client state variable that identifies a test client and performance measures for the additional scripts are developed based on evaluation by the test clients. The client state variable can be at least one of Internet Protocol (IP) address parameter, browser cookie parameter, and unified resource locator (URL) parameter.

At message 10, script harvesting system 164 sends the additional scripts 172 to the embedded script 168a. As a result, the additional scripts 172 are embedded in the webpage. In some implementations, additional scripts 172 are provisioned from a content delivery network (CDN).

At message 11, the updated interface version of the portion of the webpage is rendered to the user according to the first machine-learned configuration 124a as specified by the rendering values. Applying the first machine-learned configuration 124a can include, according to one implementation, use of a presentation database 600B, which serves as a rule repository that identifies possible rendering values 664 for each of the dimensions 654 of each of the elements 644abc of the webpage. The additional scripts 172 apply the first machine-learned configuration 124a to the presentation database 600B to determine rendering values corresponding to dimensions of elements of the portion of the webpage as selected by the configuration 124a. In some implementations, the updated interface version can also create a new presentation database with a new rule repository.

At message 12, once the update interface version of the portion of the webpage is rendered to the user and the user's interactions with the updated interface version of the portion of the webpage are recorded, the additional scripts 172 send the performance data to the evaluation services identified by the object 162a.

At message 13, the additional scripts 172 request the recommendation data from one of the recommendation service 182a determined by the load modulator 246 and further receive the recommendation data from the recommendation service 182a at message 14.

At message 15, the additional scripts 172 request a further configuration of the portion of the webpage from the object harvesting system 154 and receive further objects at message 16.

Figure 7A:
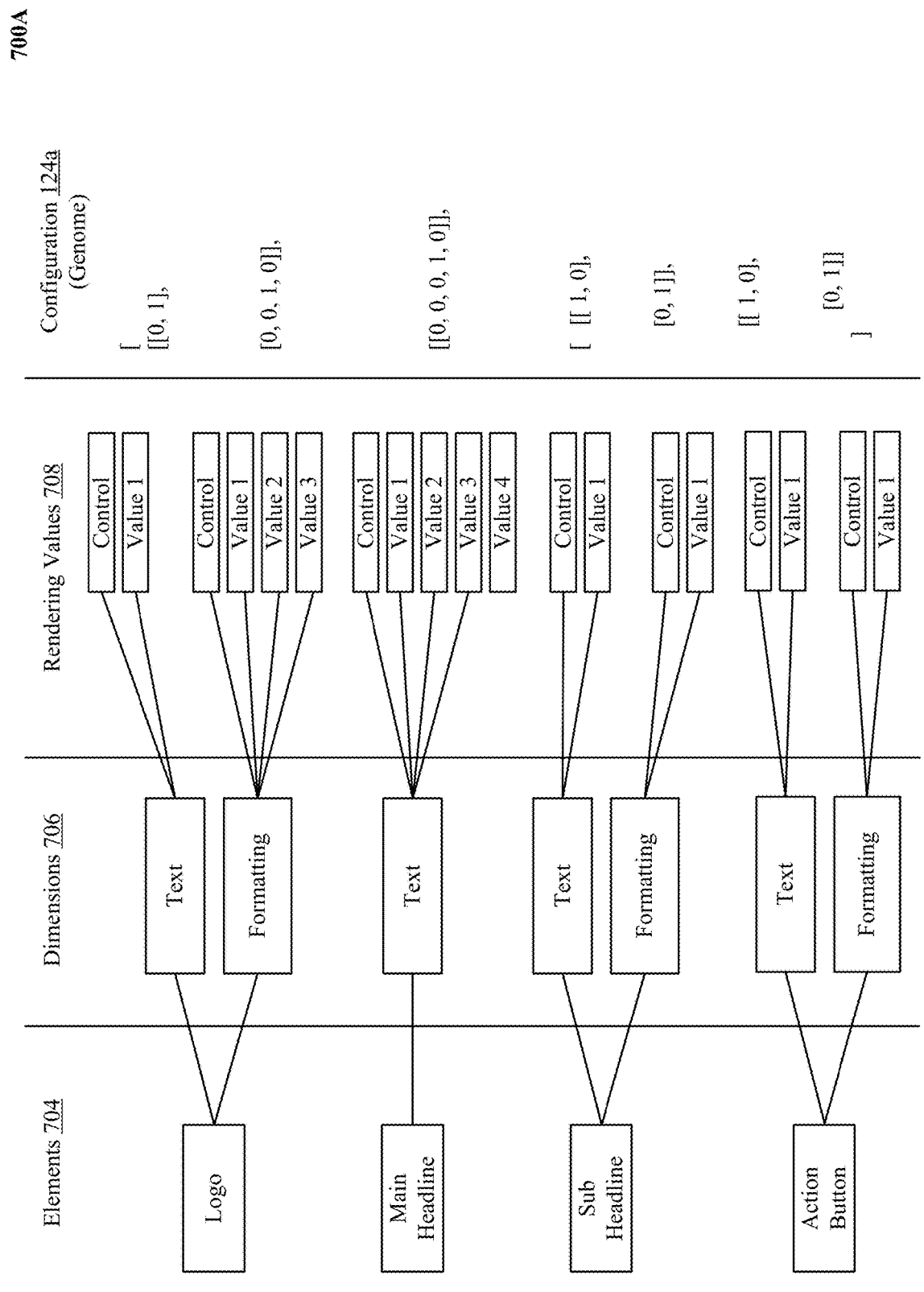
Figure 7B:
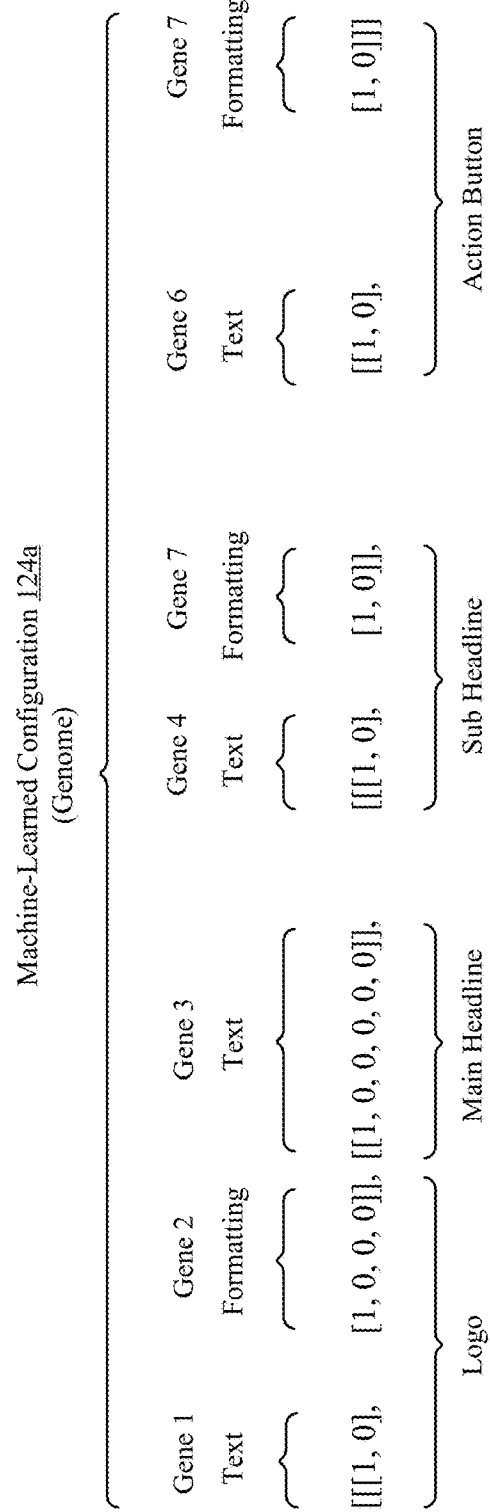

FIGS. 7A, 7B, and 7C show various aspects of the machine-learned configurations that are part of the objects returned to the clients.

Staring with FIG. 7A, it shows that a webpage has four elements 704: logo, main headline, sub headline, and action button. Elements 704 have corresponding dimensions 706. Logo has two dimensions: logo text and logo formatting.

Main headline has one dimension: main headline text. Sub headline has two dimensions: sub headline text and sub head line formatting. Action button has two dimensions: action button text and action button formatting. Dimensions 706 have corresponding rendering values 708. Logo text has two rendering values: control value and value 1. Logo formatting has four rendering values: control value, value 1, value 2, and value 3. Main headline text has five rendering values: control value, value 1, value 2, value 3, and value 4. Sub headline text has two rendering values: control value and value 1. Sub headline formatting has two rendering values: control value and value 1. Action button text has two rendering values: control value and value 1. Action button formatting has two rendering values: control value and value 1.

Configuration 124*a* can encode the rendering values in a binary sequence called genome, which is further compartmentalized into subsequences called genes. Turning to FIG. 7B, each gene can represent a dimension of an element of a webpage and encode rendering values corresponding to the dimension. For example, the sub headline element can be represented by four bits grouped into two genes. For each gene, only one of the bits can be active or hot (e.g., represented by 1) so as to identify a particular rendering value from a set of available rendering values. The leftmost bit can represent the control value of a gene, which, in one example, for main headline might indicate plain text. The second, third, and forth bits might, for example, indicate bold text, italics text, and bold underlined text, respectively. It will be appreciated that many other encodings are possible. For example, a two-bit numeric value might be used, with 0 indicating plain text, 1 indicating bold text, 2 indicating italics text, and 3 indicating bold underlined text.

FIG. 7C shows examples of machine-learned configurations evolved by the conversion system 104 and successively returned to the clients in response to requests for further configurations of the webpage. These configurations differ from each other on the basis of the genes and underlying bits highlighted in FIG. 7C. Each of these configurations can be assigned a different treatment identifier (ID).

Figures 8A, 8B:
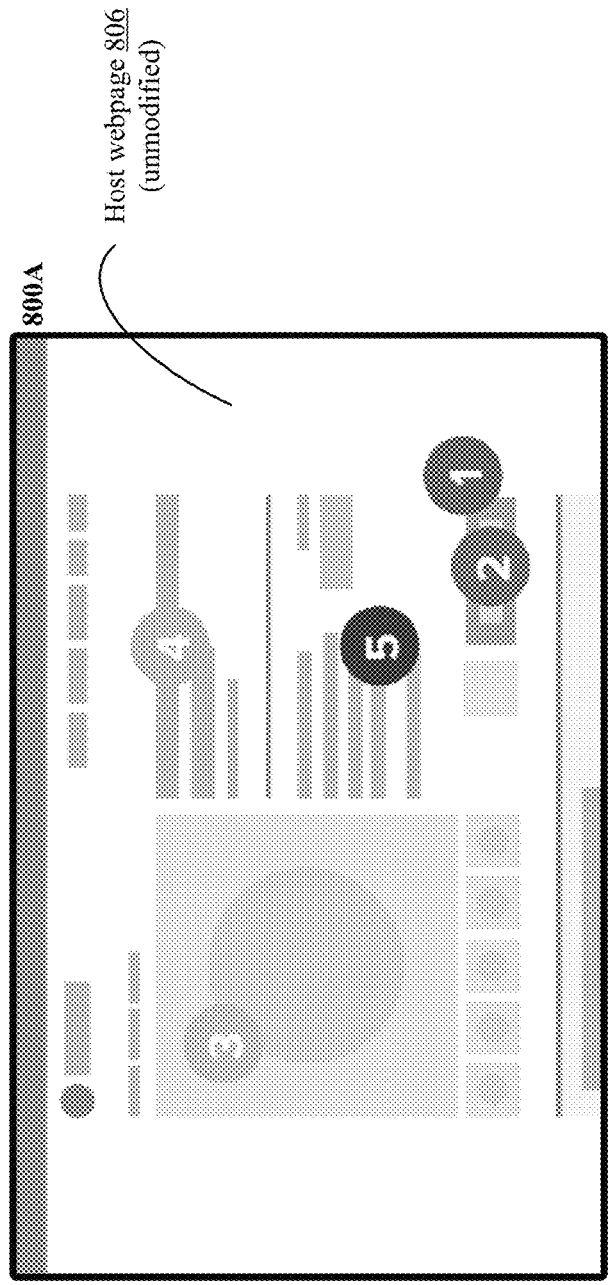
FIGS. 8A and 8B depict one implementation of modifying elements of specific portions of a webpage as selected by a machine-learned configuration without modifying other portions of the webpage.

FIGS. 8A and 8B depict one implementation of modifying elements 844*abc* of specific portions of a webpage as selected by a machine-learned configuration without modifying other portions 806 of the webpage 800A. The host (e.g., Shoes.com) places HTML divs on the webpage 800A that are identified by HTML namespace ids. The additional scripts 172 apply the rendering values from the configuration 124*a* only within those HTML divs, thereby avoiding globally replacing configuration of other portions or elements on the webpage 800A.

Computer System

Figure 9:
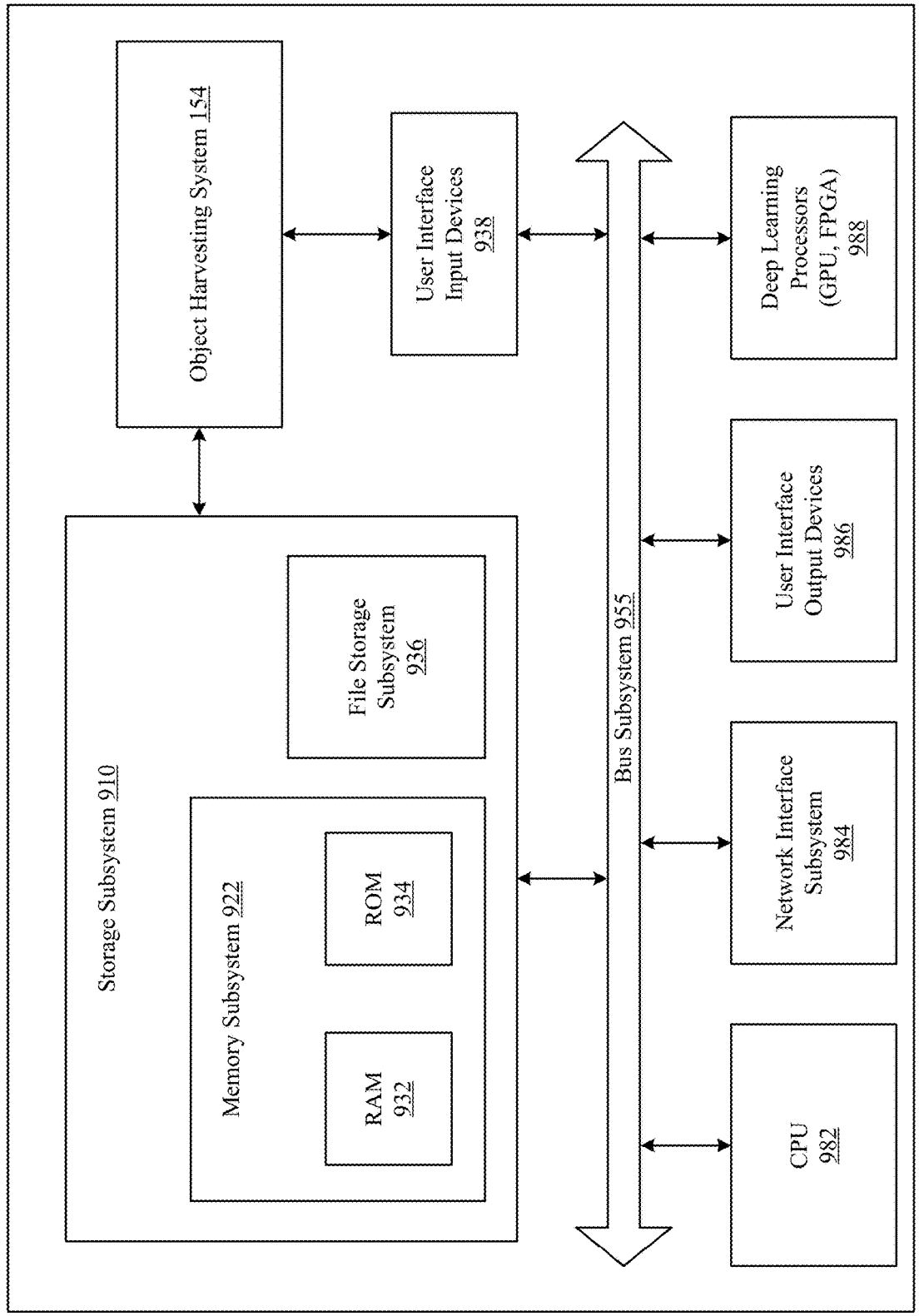
FIG. 9 illustrates one implementation of a computer system that can be used to implement the technology disclosed.

FIG. 9 illustrates one implementation of a computer system 900 that can be used to implement the technology disclosed. Computer system 900 includes at least one central processing unit (CPU) 982 that communicates with a number of peripheral devices via bus subsystem 955. These peripheral devices can include a storage subsystem 910 including, for example, memory devices and a file storage subsystem 936, user interface input devices 938, user interface output devices 986, and a network interface subsystem 984. The input and output devices allow user interaction with computer system 900. Network interface subsystem 984 provides an interface to outside networks, including an interface to corresponding interface devices in other computer systems. The object harvesting system 154 can be communicably linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 986 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. These software modules are generally executed by deep learning processors 988.

Deep learning processors 988 can be graphics processing units (GPUs) or field-programmable gate arrays (FPGAs). Deep learning processors 988 can be hosted by a deep learning cloud platform such as Google Cloud Platform™, Xilinx™, and Cirrascale™. Examples of deep learning processors 988 include Google's Tensor Processing Unit (TPU)™, rackmount solutions like GX4 Rackmount Series™, GX9 Rackmount Series™, NVIDIA DGX-1™ Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™ NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 922 used in the storage subsystem 910 can include a number of memories including a main random access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 910, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or less components than the computer system depicted in FIG. 9.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Particular Implementations

We describe a system and various implementations of autonomous configuration of conversion code that controls display and functionality of a portion of a webpage. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

The technology disclosed presents a system for autonomous configuration of conversion code that controls display and functionality of a portion of a webpage. The portion has a plurality of elements and each element has a plurality of dimensions along which a rendering value can be specified.

The system comprises a server. The server has memory and a processor coupled to the memory. The processor is configured to, in response to receiving a request from a client executing an embedded script for a configuration of a portion of the webpage, return toward the client an object. The object can be a JavaScript Object Notation (JSON) object. The object includes: (i) rendering values corresponding to dimensions of elements of the portion of the webpage and rendering algorithm parameters as selected by a first machine-learned configuration, (ii) an identification of one or more additional scripts with conversion code required in order to generate an updated interface version of the portion of the webpage by applying the first machine-learned configuration to the portion of the webpage and to control functionality of the updated interface version, and (iii) an identification of evaluation services to which to send data for performance measures that identify success of the updated interface version in promoting target online user behavior.

The updated interface version of the portion of the webpage presents at least one of: (i) a new arrangement of existing elements of the portion of the webpage, (ii) new elements of the portion of the webpage with new dimensions and new rendering values, (iii) new dimensions of the existing elements, (iv) new rendering values of existing dimensions, and/or (v) new functionality of the elements in response to user selection (e.g., rendering different recommendation data (e.g., images), using different recommendation algorithm to generate the recommendation data, transitioning to a different subsequent webpage).

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The object can also include an identification of recommendation services from which to request recommendation data in response to an element of the updated interface version of the portion of the webpage being selected. The object can further include a load modulator that determines from which one of the recommendation services to request the recommendation data from based on at least one of: (i) processing load of the recommendation services, (ii) pre-caching status of the recommendation services, and (iii) recommendation algorithms used by the recommendation services.

The object can also include a treatment identifier (ID) of the object that is persisted at the client for use in requesting further configurations of the portion of the webpage from the client.

One of the additional scripts includes conversion code which, when executed by the client, can (i) render the updated interface version of the portion of the webpage according to the first machine-learned configuration as specified by the rendering values, (ii) control the functionality of the updated interface version in response to an element of the updated interface version being selected, (iii) send data for the performance measures toward the identified evaluation services, and (iv) request the recommendation data from one of the recommendation services determined by the load modulator, and further render the recommendation data in the updated interface version.

The additional script can also include conversion code which, when executed by the client, will request from the server a further configuration of the portion of the webpage. The conversion code in the additional script further can send the treatment ID of the object toward the server in conjunction with the request for the further configuration of the portion of the webpage.

The updated interface version of the portion of the webpage can be autonomously configured by a website modification service without affirmative action from a host of the webpage. The website modification service controls only of the portion of the webpage.

The object can be returned to selective test clients based on a client state variable that identifies a test client and performance measures for the object are developed based on evaluation by the test clients during a testing period. The client state variable can be at least one of Internet Protocol (abbreviated IP) address parameter, browser cookie parameter, and unified resource locator (abbreviated URL) parameter.

The client can be a browser-based application running on an endpoint. The client can also be a native application running on an endpoint.

The server can iteratively return toward the client successive objects in response to receiving requests from the client.

Each of the features discussed in the particular implementation section for other implementations apply equally to this implementation. As indicated above, all the other features are not repeated here and should be considered repeated by reference.

Other implementations may include a non-transitory computer readable storage medium storing instructions executable by a processor to perform actions of the system described above.

The technology disclosed presents a method of autonomously configuring conversion code that controls display and functionality of a portion of a webpage. The portion has a plurality of elements and each element has a plurality of dimensions along which a rendering value can be specified.

The method includes, in response to receiving a request from a client executing an embedded script for a configuration of a portion of the webpage, a server returning toward the client an object. The object can be a JavaScript Object Notation (JSON) object. The object includes: (i) rendering values corresponding to dimensions of elements of the portion of the webpage as selected by a first machine-learned configuration, (ii) an identification of one or more additional scripts with conversion code required in order to generate an updated interface version of the portion of the webpage by applying the first machine-learned configuration to the portion of the webpage and to control functionality of the updated interface version, and (iii) an identification of evaluation services to which to send data for performance measures that identify success of the updated interface version in promoting target online user behavior.

Each of the features discussed in the particular implementation section for other implementations apply equally to this implementation. As indicated above, all the other features are not repeated here and should be considered repeated by reference.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

What is claimed is:

1. A system for autonomous configuration of conversion code that controls display and functionality of a portion of a webpage, the portion having a plurality of elements, each element having a plurality of dimensions along which a rendering value can be specified, comprising:
a server having memory and a processor coupled to the memory, the processor configured to, in response to receiving a request from a client executing an embedded script for a configuration of a portion of the webpage, return toward the client an object that includes:
rendering values corresponding to dimensions of elements of the portion of the webpage and rendering algorithm parameters as selected by a first machine-learned configuration,
an identification of one or more additional scripts as conversion code required in order to generate an updated interface version of the portion of the webpage by applying the first machine-learned configuration to the portion of the webpage and to control functionality of the updated interface version, wherein the additional scripts apply the first machine-learned configuration to a presentation database to determine a subset of the rendering values corresponding to the dimensions of elements of the portion of the webpage as selected by the first machine-learned configuration, and
an identification of evaluation services to which to send data for performance measures that identify success of the updated interface version in promoting target online user behavior.

2. The system of claim 1, wherein the object further includes an identification of recommendation services from which to request recommendation data in response to an element of the updated interface version of the portion of the webpage being selected.

3. The system of claim 2, wherein the object further includes a load modulator that determines from which one of the recommendation services to request the recommendation data from based on at least one of:
processing load of the recommendation services,
pre-caching status of the recommendation services, and
recommendation algorithms used by the recommendation services.

4. The system of claim 1, wherein the object further includes a treatment identifier (ID) of the object that is persisted at the client for use in requesting further configurations of the portion of the webpage from the client.

5. The system of claim 1, wherein one of the additional scripts, when executed by the client, will:
render the updated interface version of the portion of the webpage according to the first machine-learned configuration as specified by the rendering values;
control the functionality of the updated interface version in response to an element of the updated interface version being selected;
send data for the performance measures toward the identified evaluation services; and
request the recommendation data from one of the recommendation services determined by the load modulator, and further render the recommendation data in the updated interface version.

6. The system of claim 5, wherein the additional script, when executed by the client, will request from the server a further configuration of the portion of the webpage.

7. The system of claim 6, wherein the additional script further will send the treatment ID of the object toward the server in conjunction with the request for the further configuration of the portion of the webpage.

8. The system of claim 1, wherein the updated interface version of the portion of the webpage is autonomously configured by a website modification service without affirmative action from a host of the webpage, and
wherein the website modification service controls only of the portion of the webpage.

9. The system of claim 1, wherein the object is returned to selective test clients based on a client state variable that identifies a test client and performance measures for the object are developed based on evaluation by the test clients during a testing period.

10. The system of claim 9, wherein the client state variable is at least one of Internet Protocol (abbreviated IP) address parameter, browser cookie parameter, and unified resource locator (abbreviated URL) parameter.

11. The system of claim 1, wherein the client is at least one of browser-based application running on an endpoint and a native application running on an endpoint.

12. The system of claim 1, wherein the object is a JavaScript Object Notation (JSON) object.

13. The system of claim 1, wherein the server iteratively returns toward the client successive objects in response to receiving requests from the client.

14. A method of autonomously configuring conversion code that controls display and functionality of a portion of a webpage, the portion having a plurality of elements, each element having a plurality of dimensions along which a rendering value can be specified, including:

in response to receiving a request from a client executing an embedded script for a configuration of a portion of the webpage, return toward the client an object that includes:
  rendering values corresponding to dimensions of elements of the portion of the webpage and rendering algorithm parameters as selected by a first machine-learned configuration,
  an identification of one or more additional scripts as conversion code required in order to generate an updated interface version of the portion of the webpage by applying the first machine-learned configuration to the portion of the webpage and to control functionality of the updated interface version, wherein the additional scripts apply the first machine-learned configuration to a presentation database to determine a subset of the rendering values corresponding to the dimensions of elements of the portion of the webpage as selected by the first machine-learned configuration, and
  an identification of evaluation services to which to send data for performance measures that identify success of the updated interface version in promoting target online user behavior.

15. The method of claim 14, wherein the object further includes an identification of recommendation services from which to request recommendation data in response to an element of the updated interface version of the portion of the webpage being selected.

16. The method of claim 15, wherein the object further includes a load modulator that determines from which one of the recommendation services to request the recommendation data from based on at least one of:
  processing load of the recommendation services,
  pre-caching status of the recommendation services, and
  recommendation algorithms used by the recommendation services.

17. The method of claim 14, wherein the object further includes a treatment identifier (ID) of the object that is persisted at the client for use in requesting further configurations of the portion of the webpage from the client.

18. The method of claim 14, wherein one of the additional scripts, when executed by the client, will:
  render the updated interface version of the portion of the webpage according to the first machine-learned configuration as specified by the rendering values;
  control the functionality of the updated interface version in response to an element of the updated interface version being selected;
  send data for the performance measures toward the identified evaluation services; and
  request the recommendation data from one of the recommendation services determined by the load modulator, and further render the recommendation data in the updated interface version.

19. The method of claim 18, wherein the additional script, when executed by the client, will request from the server a further configuration of the portion of the webpage.

20. A non-transitory computer readable storage medium impressed with computer program instructions for autonomous configuration of conversion code that controls display and functionality of a portion of a webpage, the portion having a plurality of elements, each element having a plurality of dimensions along which a rendering value can be specified, the instructions, when executed on a processor, implement a method comprising:
  in response to receiving a request from a client executing an embedded script for a configuration of a portion of the webpage, return toward the client an object that includes:
    rendering values corresponding to dimensions of elements of the portion of the webpage and rendering algorithm parameters as selected by a first machine-learned configuration,
    an identification of one or more additional scripts as conversion code required in order to generate an updated interface version of the portion of the webpage by applying the first machine-learned configuration to the portion of the webpage and to control functionality of the updated interface version, wherein the additional scripts apply the first machine-learned configuration to a presentation database to determine a subset of the rendering values corresponding to the dimensions of elements of the portion of the webpage as selected by the first machine-learned configuration, and
    an identification of evaluation services to which to send data for performance measures that identify success of the updated interface version in promoting target online user behavior.

* * * * *